United States Patent [19]

Carmien

[11] Patent Number: 5,031,272

[45] Date of Patent: Jul. 16, 1991

[54] TOOL HANDLE AND METHOD OF ATTACHING A HANDLE TO A PERCUSSIVE TOOL HEAD

[76] Inventor: Joseph A. Carmien, 525 N. Maple Dr., Beverly Hills, Calif. 90210

[21] Appl. No.: 486,440

[22] Filed: Feb. 28, 1990

[51] Int. Cl.[5] ........................ A47B 97/02; B25D 1/00; B25G 3/34; F16B 7/08

[52] U.S. Cl. .................................... 16/110 R; 81/20; 403/267; 403/268; 156/294; 156/295

[58] Field of Search ............ 16/110 R; 156/294, 295; 403/268, 267, 266, 184, 201, 368, 372; 76/103, 109; 81/20

[56] References Cited

U.S. PATENT DOCUMENTS

| | | | |
|---|---|---|---|
| 404,663 | 6/1889 | Thompson et al. . | |
| 894,155 | 7/1908 | Layton . | |
| 1,409,142 | 3/1922 | Gerson | 16/DIG. 12 |
| 1,435,851 | 11/1922 | Isham . | |
| 2,205,769 | 6/1940 | Sweetland . | |
| 2,837,381 | 6/1958 | Sarlandt . | |
| 2,850,331 | 9/1958 | Curry et al. . | |
| 3,090,653 | 5/1963 | Stump | 403/267 |
| 3,753,602 | 8/1973 | Carmien | 145/29 R |
| 3,819,288 | 6/1974 | Carmien | 403/263 |
| 3,874,433 | 4/1975 | Shepherd, Jr. et al. | 145/29 R |
| 3,877,826 | 4/1975 | Shepherd, Jr. et al. | 403/267 |
| 3,915,782 | 10/1975 | Davis et al. | 16/110 R |
| 3,917,421 | 11/1975 | Carmien et al. | 403/268 |
| 4,030,847 | 6/1977 | Carmien | 403/263 |
| 4,085,784 | 4/1978 | Fish | 145/29 R |
| 4,139,930 | 2/1979 | Cox | 145/29 R |
| 4,287,640 | 9/1981 | Keathley | 16/110 R |
| 4,291,998 | 9/1981 | Santos | 403/263 |
| 4,367,969 | 1/1983 | Carmien | 403/253 |
| 4,404,708 | 9/1983 | Winter | 16/110 R |
| 4,558,726 | 12/1985 | Clay | 81/20 |

FOREIGN PATENT DOCUMENTS

| | | | |
|---|---|---|---|
| 151483 | 5/1951 | Australia | 403/368 |
| 1800559 | 6/1970 | Fed. Rep. of Germany | 81/20 |
| 2185209 | 7/1987 | United Kingdom | 16/111 R |

*Primary Examiner*—Robert L. Spruill
*Assistant Examiner*—Carmine Cuda
*Attorney, Agent, or Firm*—Kelly, Bauersfeld & Lowry

[57] ABSTRACT

A tool handle includes a tapered shaft retainer which is dimensioned for insertion into the eyehole of a tool head, a high strength handle shaft bonded within the shaft retainer, and a grip which ensheathes the handle shaft. The shaft retainer includes an outer surface portion generally corresponding to a portion of the eyehole, an upper enlarged portion which is incapable of passing through the eyehole, and a slightly tapered inner cavity. The shaft retainer is inserted into the eyehole from the top end thereof, a measured adhesive is placed into the inner cavity, and then the handle shaft is pressed therein through a lower end of the eyehole. In order to improve the bond between the shaft retainer and the upper end of the handle shaft, keyways are provided on the upper end of the shaft and within the inner cavity of the shaft retainer. The grip may be molded directly onto the handle shaft prior to assembly of the shaft retainer to the handle shaft, or the grip may be slidably received onto the handle shaft afterwards and then attached thereto. In such a case, in one preferred method of assembly, an adhesive compound is placed within the grip prior to its being slid onto the handle shaft. In another preferred method of assembly, a mechanical attachment is utilized between the girp and the handle shaft.

42 Claims, 4 Drawing Sheets

FIG. 2
FIG. 1
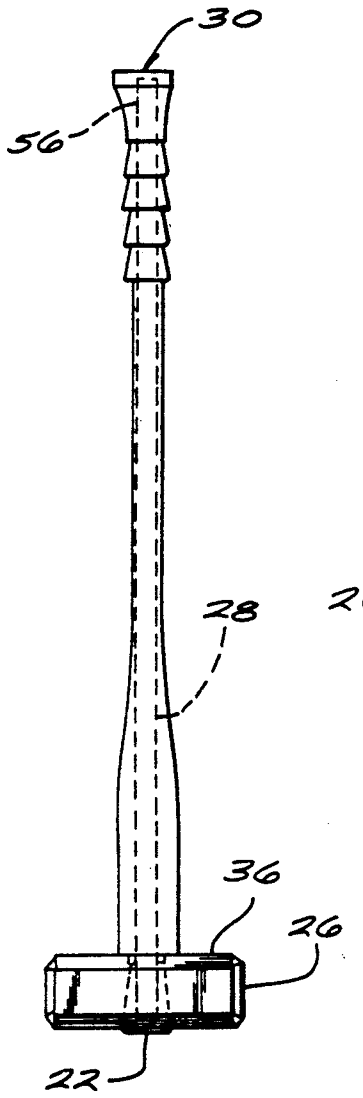
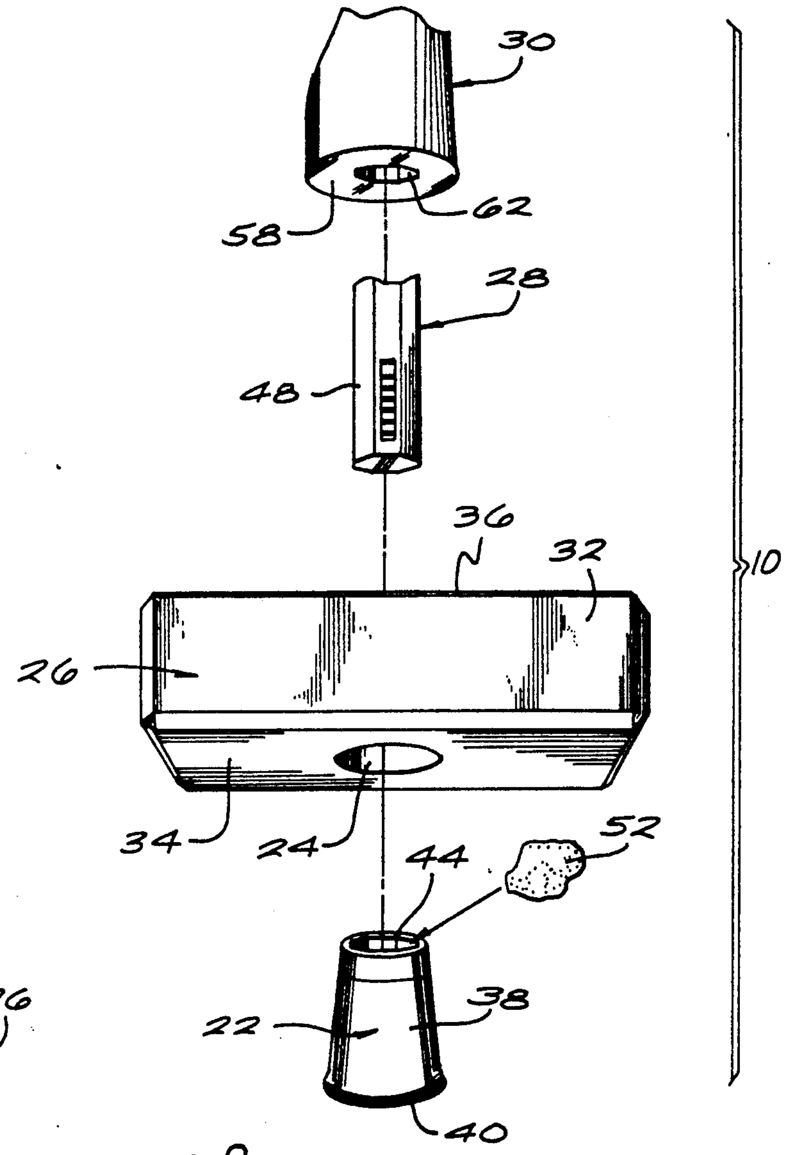
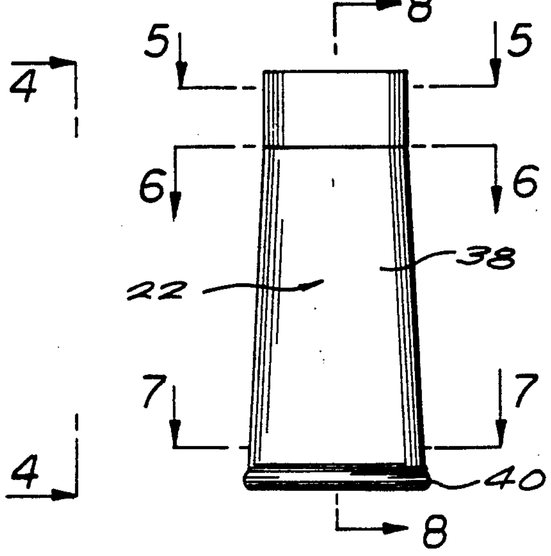
FIG. 3

FIG. 4
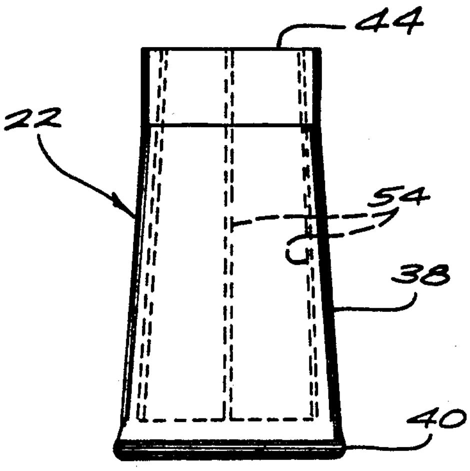
FIG. 5
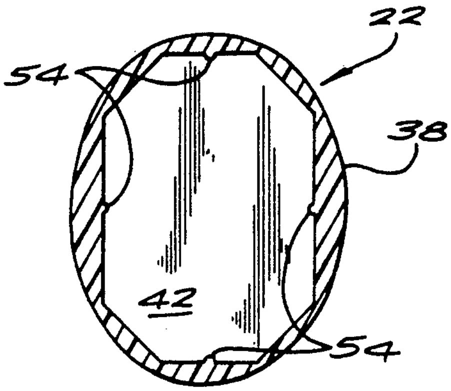
FIG. 6
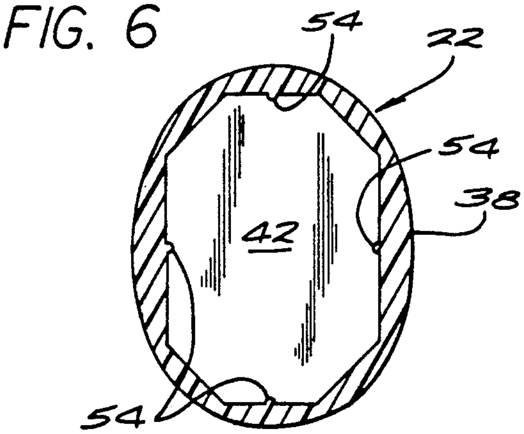
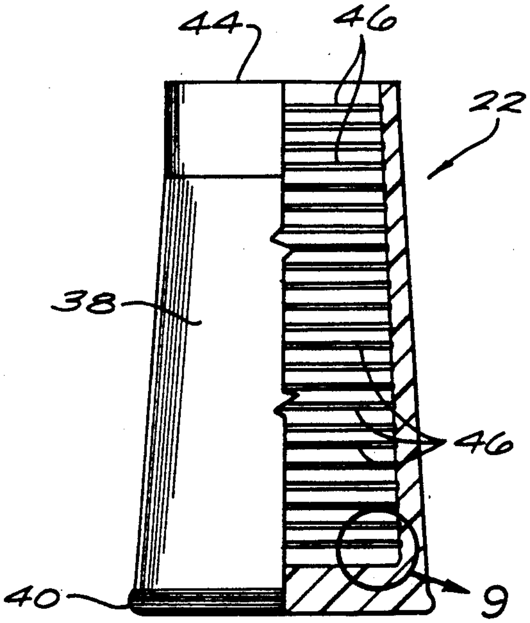
FIG. 8
FIG. 7
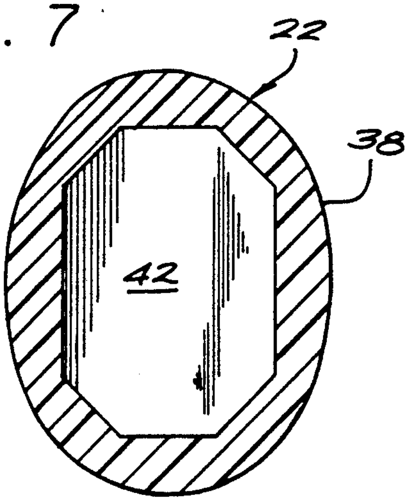
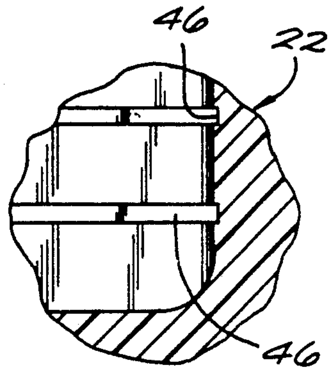
FIG. 9

TOOL HANDLE AND METHOD OF ATTACHING A HANDLE TO A PERCUSSIVE TOOL HEAD

BACKGROUND OF THE INVENTION

This invention relates generally to hand tools. More particularly, the present invention relates to an improved composite handle and means for attaching the handle to the heads of percussive tools, such as hammers, hatchets, axes and the like, in such a manner that the union will be strong and invariable during the normal useful life of the tool, and which may be utilized equally well during the original manufacture of the the tool or while replacing the handle in the field.

Until recent years the only material used for handles in percussive tools, i.e., striking, cutting and/or prying tools such as hammers, sledges, peaveys, axes, etc., has been wood. For this reason, the method of attaching the handle to the tool head, whatever type it might have been, was dictated by the property characteristics of wood. It is generally recognized that, other than being strong enough to withstand handle abuse the tool would regularly take, there are two conditions which must be accommodated when inserting a wood handle into a tool head: to keep the tool head attached to the handle under all working conditions; and to maintain the head tight to the handle.

Traditionally, in percussive tools such as sledge hammers, the tool head includes an aperture or eyehole through its body which has a single or double taper. In both cases, the taper expands at the top of the tool head or that portion which is normally directed away from the user when the tool is in use. When a wooden handle is driven through the eyehole from the bottom side of the tool head, the excess wood protruding from the top side is cut off, and some wedging device, such as an ordinary wedge, is driven into the wood so that the upper end thereof is expanded to provide an inverted frustum which, theoretically, is tightly expanded into the tool eyehole. The expanded section of wood must fit within the upper tapered portion of the eyehole tightly so that the head cannot fly off during use. This is a very elemental assembly which has been in use for many years.

The use of wedges and the like to expand the upper section of the wood within the eyehole inherently involves damage to the handle which adversely affects many of the physical properties which are desired to be retained. Further, the wedges that are driven into the end of the wooden handle often tend to work loose, due most frequently to changes in humidity which cause alternate swelling and contraction of the wood with a gradual decrease in tightness. Many expedients have been employed in an attempt to overcome these faults, including the provision of metal sleeves to hold the tool handle in place, the use of adjustable wedges which must be periodically driven by the owner of the tool to compensate for loosening of the joint, the use of metal handles, the casting of wedges in position in the tool, and the provision of rubber sleeves interposed between the handle and the head. None of these aforementioned expedients have proven to be entirely satisfactory.

The primary reason why prior handles are typically inserted from the bottom and wedged at the top of the tool head is that there are very few tools which have an eyehole large enough to provide an opening through which the grip of the handle can pass. In prior handles, if the handle were small enough to pass through the eyehole, the grip would be much too small for a man to properly grasp it, and the wood would be too small to resist the abuse that the tool would take. Notably, there is one category of percussive tools that does not require the handle to be inserted from the bottom and then affixed within the eyehole as described above. This category includes the pick or pick-mattock style of tool in which the eyehole is so massive that even a large grip can be passed through the eyehole. Traditionally the handles for such pick or pick-mattock style tools are shaped so that the upper end has a reverse taper allowing the pick to be dropped over the grip onto the end farthest away from the user so that the expanded end of wood is large enough to lock the tool head in place and prevent it from ever sliding off the upper end. Of course, the tool head can always be removed in the same manner it is placed on the handle, by removing it from the butt or grip end.

Recent years have seen the development of extremely strong composite tool handles formed of reinforcing fibers cured within a resin composite. Such reinforcing fibers may include fiberglass, polyester, boron, kevlar or graphite, and suitable resin composites include polyester, epoxy, phenolics, etc. With the development of these composite materials, the shaft underneath the tool head can now be made with a cross-section small enough to pass through the conventional eyehole of percussive tool heads, yet have sufficient strength to withstand the tremendous impact forces to be applied.

As advanced materials have been introduced to replace wood, the materials have been either bonded into the eyehole of the tool, substituting the bond for the old traditional wedge, and/or welded such as metal to metal. Whereas these techniques are suitable to some degree for the manufacture of original tools in which the handle is installed with appropriate machinery and equipment at a factory, the techniques are not suitable when practiced in the field. In the case of bonding, composite shafts have been attached to tool heads primarily by means of adhesives in the epoxy field. When utilizing such adhesives, despite the continued development of these materials, it takes care, precision and good workmanship to properly install a replacement handle in a tool head, reliably in the field with no secondary tools to assist. Even in factories where the tool head is installed on a production basis, high levels of quality control must be practiced in order to insure that the head is secured to the handle under all anticipated working conditions. Further, since the high strength composite shafts are usually inadequate in cross-sectional size to be comfortable for a user's hands, a grip of rubber or some other plastic material is usually molded onto the shaft or subsequently bonded thereto in a manner which guarantees that the grip will not accidentally slide off the shaft.

Accordingly, there has been a need for a highly reliable, simplified method by which a handle can be installed onto a percussive tool head, in which the handle is permitted to pass through the eyehole from the upper end in a manner which effectively prohibits the tool head from flying off the handle unintentionally. A handle for use in such method must include a minimum number of separate parts in order to greatly simplify assembly of the handle to the tool head, and also permit attachment of a grip which comfortably fits a user's hands. Further, an improved method of attaching a handle to a percussive tool is needed which facilitates use of reinforced composite tool handles as field replacements for older tools, which overcomes drawbacks associated with fixing such handles within the eyehole of the tool head solely by means of an epoxy. Moreover, an improved tool handle and method of attaching the handle to a percussive tool is needed which simplifies the manufacture and assembly of tools for both a field user and original equipment manufacturers. The present invention fulfills these needs and provides other related advantages.

SUMMARY OF THE INVENTION

The present invention resides in an improved tool handle and method of attaching the handle to a percussive tool in such a manner that the union will be strong and invariable during the normal useful life of the tool, and which may be utilized equally well during the original manufacture of the tool or while replacing the handle in the field. The improved tool handle comprises, generally, a shaft retainer dimensioned for partial insertion into a tool head through its eyehole from the top end thereof, and a high strength handle shaft which has its upper end fixed within an inner cavity of the shaft retainer. The shaft retainer is configured so that it is incapable of passing completely through the eyehole, and thus provides an anchor point against which the tool head is rigidly positioned.

In a preferred form of the invention, a percussive tool manufactured utilizing the improved tool handle typically comprises a tool head having a body and an eyehole through the body, wherein the eyehole includes a taper expanding towards the top of the tool head. The shaft retainer, which is dimensioned for partial insertion into the tool head through the eyehole from the top end thereof, forms a tapered, generally frusto-conical slug. The shaft retainer includes an outer surface portion generally corresponding to a portion of the eyehole adjacent to the top of the tool head, an upper enlarged portion incapable of passing through the eyehole, and an inner cavity having an opening opposite to the upper enlarged portion. The inner cavity is slightly tapered so as to expand towards an upper end of the cavity opposite to the opening thereof. Further, the surfaces of the inner cavity include keyways which extend generally perpendicularly to the longitudinal axis of the shaft retainer.

The high strength handle shaft has an upper end thereof inserted into the inner cavity of the shaft retainer. The upper end of the handle shaft is bonded by means of an adhesive within the inner cavity such that the shaft extends substantially the length of the eyehole and downwardly from a lower aperture thereof. In order to increase the strength of the bond between the handle shaft and the shaft retainer, at least one of the surfaces of the upper end of the handle shaft includes keyways similar to those keyways provided within the inner cavity of the shaft retainer.

The shaft retainer includes means within the inner cavity for rigidly aligning the longitudinal axis of the handle shaft with the longitudinal axis of the shaft retainer. The aligning means includes a plurality of longitudinal ribs which protrude into the inner cavity. These ribs frictionally engage the handle shaft as it is inserted into the inner cavity. The frictional engagement between the ribs and the handle shaft is such that the handle shaft may be lifted without a separation of the shaft retainer from the handle shaft, even when the shaft retainer supports a tool head.

Means are provided for bonding the upper end of the shaft within the inner cavity of the shaft retainer. Preferably, the bonding means comprises a measured adhesive which is placed into the inner cavity of the shaft retainer prior to insertion of the handle shaft. As the shaft is inserted, the adhesive evenly spreads between the handle shaft and the shaft retainer, and after it cures, a rigid bond between the two members is formed.

A grip ensheathes a lower end of the handle shaft, and is preferably positioned so that one end of the grip is situated adjacent to a lower portion of the tool head. Preferably, the grip is molded directly onto the lower end of the handle shaft prior to assembly of the handle shaft to the shaft retainer. However, the grip may be slidably received onto the handle shaft after assembly of the handle shaft to the shaft retainer, and then the grip can be attached securely to the handle shaft. If it is desired to attach the grip to the handle shaft after the shaft retainer is bonded to the handle shaft, in one preferred form of the invention, a measured adhesive is deposited into the grip so that as the grip is slid over the handle shaft, the adhesive evenly spreads between the grip and the handle shaft to form a bond therebetween. In another preferred form, the handle shaft is provided with one or more strips of barbs. These barbs permit the grip to be slid onto the handle shaft in one direction, but prevent removal of the grip from the handle shaft in another.

The handle shaft has a generally uniform cross-sectional dimension when taken perpendicular to its longitudinal axis. This cross-sectional dimension generally corresponds with the cross-sectional dimension of the inner cavity when taken perpendicular to the longitudinal axis of the shaft retainer. This helps insure that a uniform, rigid and strong bond is formed between the handle shaft and the shaft retainer.

The tool handle of the present invention greatly facilitates the rehandling of tools in the field. In the case where it is desirable to provide an existing tool head with a new handle, the method simply comprises the insertion of the tapered shaft retainer into the tool eyehole from the top end thereof. A measured adhesive is then placed into the inner cavity, and the handle shaft is pressed into the inner cavity. The adhesive uniformly spreads between the handle shaft and the shaft retainer to form a bond therebetween. If the grip has already been molded directly onto the handle shaft, the rehandling assembly process is completed.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a front elevational view of a percussive tool manufactured in accordance with the invention, illustrating a shaft retainer partially inserted into the eyehole of a sledge-type tool head, a high strength handle shaft (in phantom) which is inserted into the shaft retainer and extends outwardly therefrom, and a grip molded onto the handle shaft;

FIG. 2 is an enlarged exploded perspective view of the working end of the exemplary percussive tool shown in FIG. 1, illustrating the relationship between the tool head and the components forming the tool handle; namely, the manner in which the shaft retainer is inserted into a tapered eyehole of the tool head, wherein it receives a high strength handle shaft which is fixed therein by means of a bonding agent, and the manner in which a molded grip ensheathes the handle shaft;

FIG. 3 is an enlarged elevational view of the shaft retainer illustrated in FIGS. 1 and 2;

FIG. 4 is another elevational view of the shaft retainer taken generally along the line 4—4 of FIG. 3;

FIG. 5 is an enlarged sectional view taken generally along the line 5—5 of FIG. 3;

FIG. 6 is an enlarged sectional view taken generally along the line 6—6 of FIG. 3;

FIG. 7 is an enlarged sectional view taken generally along the line 7—7 of FIG. 3;

FIG. 8 is an enlarged elevational and partially sectional view taken generally along the line 8—8 if FIG. 3;

FIG. 9 is an enlarged sectional view of a portion of the internal cavity of the shaft retainer illustrated by the area designated by the number 9 in FIG. 8;

DETAILED DESCRIPTION OF THE PREFERRED EMBODIMENTS

Figure 10:
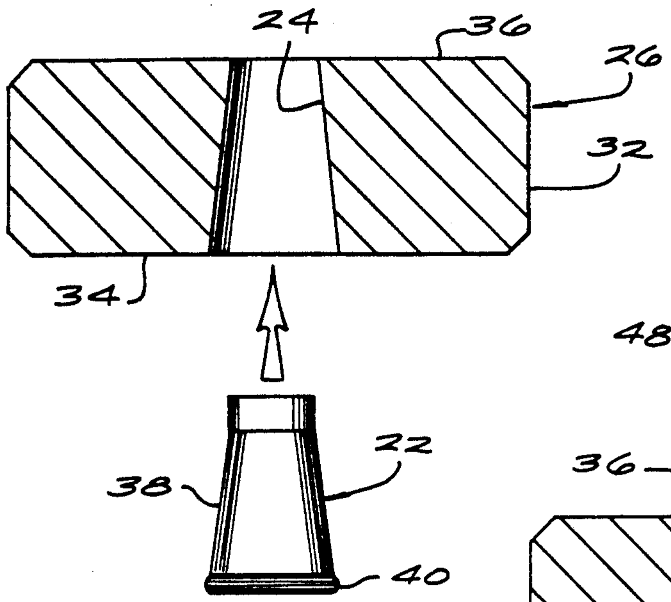
FIG. 10 is an assembly-type drawing illustrating the first step in assembling a handle to a percussive tool head, wherein the percussive tool head (in this instance a sledge) is illustrated in cross-section, and wherein the shaft retainer is inserted through an upper end of a tapered eyehole.
Figure 11:
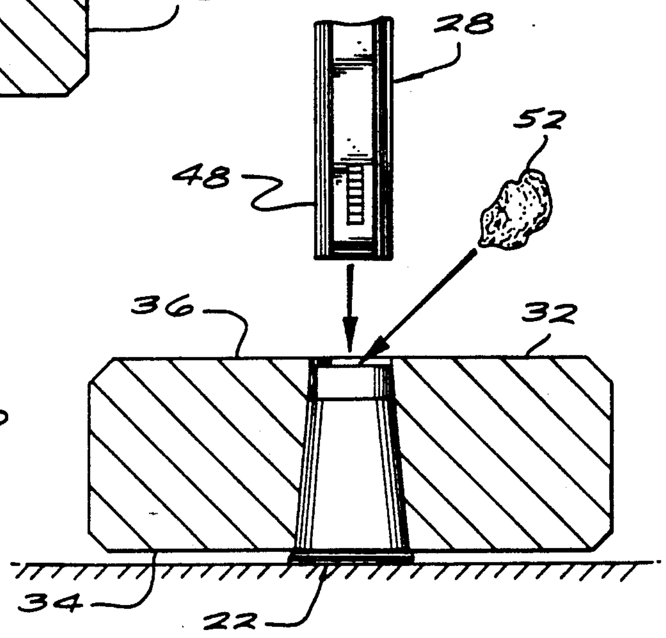
FIG. 11 is another assembly-type drawing, illustrating the next step assembling the tool handle of this invention to a percussive tool head, wherein an epoxy compound is placed into the internal cavity of the shaft retainer, and a high strength handle shaft is then inserted into the internal cavity.

As shown in the drawings for purposes of illustration, the present invention is concerned with an improved tool handle, generally designated in the accompanying drawings by the reference number 20. The improved tool handle 20 comprises, generally, a tapered slug or shaft retainer 22 which is configured for insertion into an eyehole 24 of a tool head 26, which receives and is bonded to a high strength handle shaft 28. A grip 30 is preferably molded onto a lower end of the handle shaft 28 to ensheathe the handle shaft and to position an upper end of the grip adjacent to a lower portion of the tool head 26.

Tool heads which may be advantageously utilized in connection with the improved tool handle 20 of the present invention comprise most of the broad range of percussive-type tool heads. Such tool heads typically include a body portion 32 and either a single-taper or double-tapered eyehole 24. In both instances, the eyehole 24 has a tapered portion which expands toward a top 34 of the tool head 26. The handle of the tool typically extends downwardly and away from a lower or bottom portion 36 of the tool head 26.

In accordance with the present invention, and as illustrated best in FIGS. 1 through 9 and 13 through 15, the shaft retainer 22 comprises a generally frusto-conical slug which is dimensioned for at least partial insertion into the eyehole 24 of the tool head 26. Preferably, the shaft retainer 22 is molded of a glass-reinforced nylon material for high strength and durability. The shaft retainer 22 includes an outer surface body portion 38, an upper enlarged portion 40 which is dimensioned so as to be incapable of passing through the eyehole 24, and an inner cavity 42 which has an opening 44 opposite to the upper enlarged portion 40.

As illustrated in FIGS. 4 and 8, the inner cavity 42 is slightly tapered so as to expand towards an upper end of the cavity opposite to the opening 44. This taper is on the order of three degrees. As illustrated in FIGS. 8 and 9, the surfaces of the inner cavity 42 include keyways 46 which extend generally perpendicularly to the longitudinal axis of the shaft retainer 22. The purpose of these keyways is to provide supplemental, anchoring channels into which an adhesive may flow for purposes of bonding the shaft retainer 22 to the portion of the handle shaft 28 inserted therein.

Figure 12:
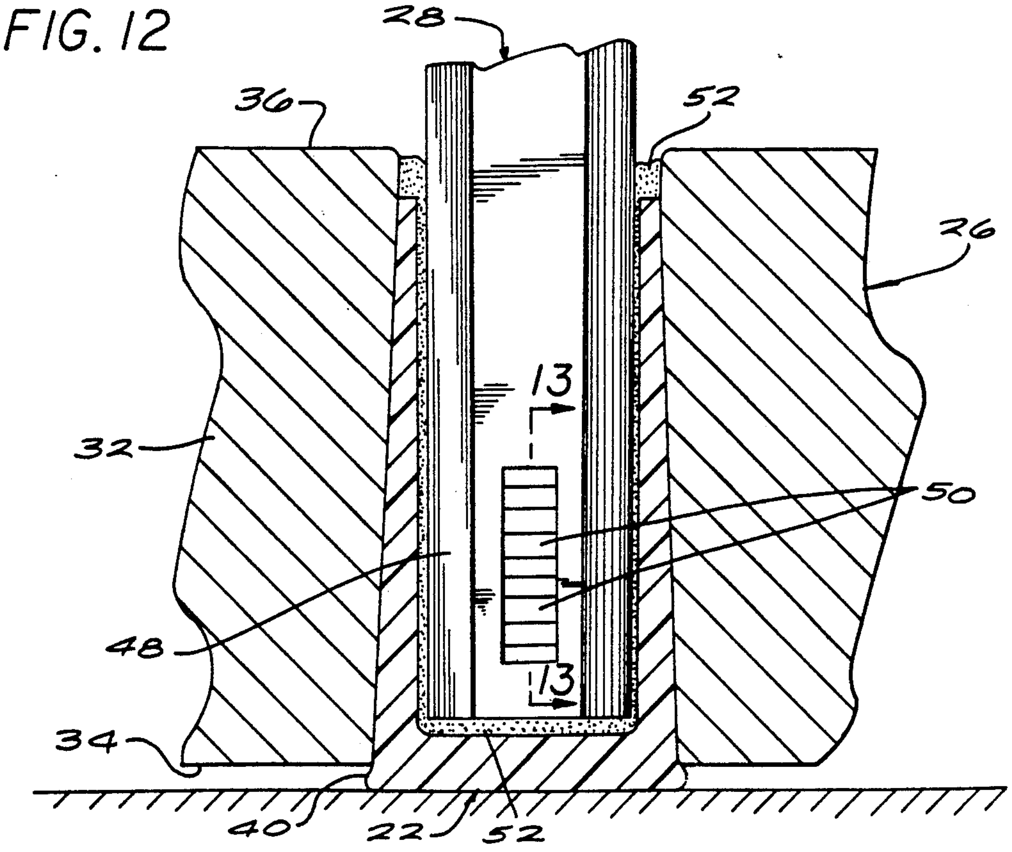
FIG. 12 is an enlarged, partially sectional view of the percussive tool head, the shaft retainer and the handle shaft after secured in place following the assembly illustrated in FIG. 11.
Figure 13:
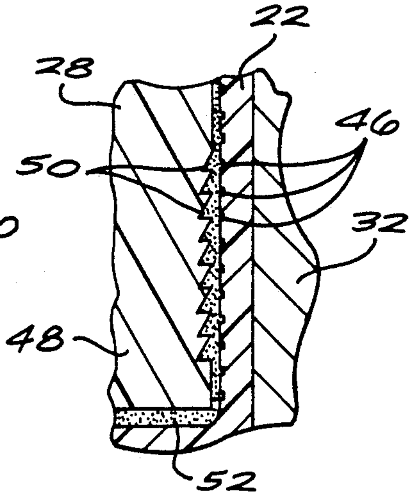
FIG. 13 is an enlarged sectional view taken generally along the line 13—13 of FIG. 12.

The high strength handle shaft 28 may be manufactured of any suitable material, including metal, but is preferably formed of a fiberglass-resin composite material. The handle shaft 28 is manufactured so that it has a generally uniform cross-sectional dimension taken generally perpendicular to its longitudinal axis, and is of sufficient length to extend substantially the entire intended length of the tool handle 20. The handle shaft 28 includes an upper end 48 configured for insertion into the inner cavity 42 of the shaft retainer 22. When the shaft retainer 22 is securely positioned within the eyehole 24, the upper end 48 of the handle shaft 28 extends substantially the length of the eyehole and downwardly from the bottom edge 36 of the tool head 26. As illustrated in FIGS. 12 and 13, at least one of the outer surfaces of the upper end 48 of the handle shaft 28, includes keyways 50 which extend generally perpendicularly to the longitudinal axis of the handle shaft 28. Like the keyways 46, the keyways 50 provide channeled anchoring slots for an adhesive 52 which is utilized to bond the upper end 48 of the handle shaft 28 within the inner cavity 42 of the shaft retainer 22.

Extending longitudinally within the inner cavity 42 of the shaft retainer 22 are a plurality of ribs 54. These ribs 54 provide means within the inner cavity 42 for rigidly aligning the longitudinal axis of the handle shaft 28 with the longitudinal axis of the shaft retainer 22. The ribs 54 are dimensioned so as to frictionally engage the upper end 48 of the handle shaft 28 as it is driven into the inner cavity 42. Since the outer dimension of the handle shaft 28 may vary, depending on manufacturing tolerances, the ribs 54 are likely to be coined to some degree as the handle shaft 28 is driven into the shaft retainer 22. This tends to create a frictional engagement between the ribs 54 and the handle shaft 28 which permits the handle shaft to be lifted immediately after being driven into the shaft retainer 22, without a separation of the shaft retainer 22 and the tool head 26, from the handle shaft 28. Further, the ribs 54 also ensure sufficient space between the upper end 48 of the handle shaft 28 and the walls of the inner cavity 42 of the shaft retainer 22, to provide sufficient clearance for the adhesive 52 to flow between the two members and into the keyways 46 and 50. Once the adhesive 52 is allowed to cure, a rigid, high strength bond is formed between the shaft retainer 22 and the handle shaft 28. The slight taper of the inner cavity 42 acts to strengthen the bond between the shaft retainer 22 and the handle shaft 28. Specifically, cured adhesive between the handle shaft 28 and the walls of the inner cavity 42 creates an incompressible wedge which cannot be removed under normal circumstances from the shaft retainer 22.

Figure 14:
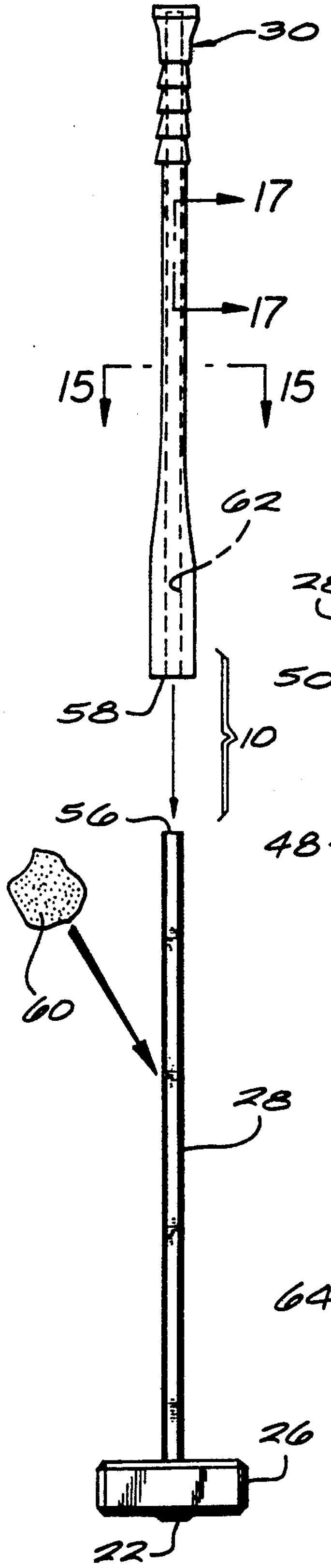
FIG. 14 is another assembly-type drawing, illustrating the manner in which a grip may be slidably received onto the handle shaft from a lower end thereof and secured in place by means of an adhesive.
Figure 15:
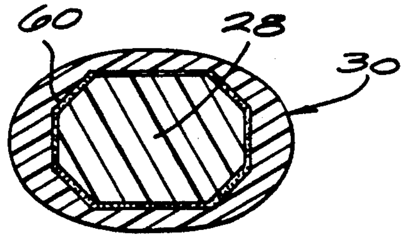
FIG. 15 is an enlarged, fragmented sectional view taken generally along the line 15—15 of FIG. 14, showing the assembly of the grip when bonded to the handle shaft.

If the grip 30 has been previously molded directly onto the handle shaft 28, then after the handle shaft 28 is mated with the shaft retainer 22, assembly of the tool handle 20 to the tool head is complete. It may be preferable in some circumstances, however, to assemble the grip 30 to the handle shaft 28 after assembly of the handle shaft to the shaft retainer 22. If such further assembly of the grip 30 to the handle shaft 28 is necessary, the grip 30 is slid over a lower end 56 of the handle shaft 28 (FIG. 14). An upper end 58 of the grip 30 may be situated adjacent to the bottom surface 36 of the tool head 26. The grip may be of any suitable length, however. The grip 30 is preferably molded into a desirable shape from any material which is strong and yet comfortably handled by a user. It should be understood, however, that the grip 30 itself primarily serves as a convenient surface and mass for which the user can grasp the tool handle 20. It does not provide the strength characteristics of the tool handle 20. Rather, the inherent strength of the tool handle 20 is provided by the shaft retainer 22 and the handle shaft 28.

In either a rehandling operation or during construction of a tool by an original equipment manufacturer, in the case where one handle is suitable for several different tool heads 26, wherein the tool heads are not necessarily of the same height or thickness between the upper and lower surfaces 34 and 36, a ferrule may be added to the tool handle 20. The ferrule would typically be provided between the upper edge of the grip 58 and the lower edge 36 of the tool head 26. Preferably, the ferrule would be permitted a limited adjustable sliding range relative to the grip 30 to accommodate various tool head thicknesses.

Following assembly of the grip to the handle shaft as shown in FIG. 14, means are provided for securely attaching the grip 30 to the handle shaft 28. This can be accomplished in many different fashions, however two preferred forms of attaching the grip 30 to the handle shaft 28 are illustrated. In one embodiment, illustrated in FIGS. 14 and 15, an adhesive 60 is placed within a cavity 62 of the grip 30 prior to its being slid over the lower end 56 of the handle shaft 28. This adhesive 60 tends to become uniformly dispersed between the inner surface of the cavity 62, and the outer surface of the handle shaft 28, and when allowed to cure, forms a strong bond between the two components.

Figure 17:
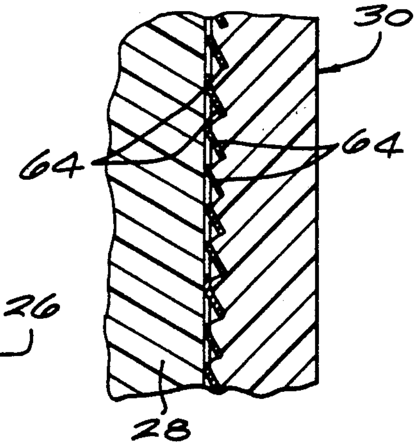
FIG. 17 is an enlarged, fragmented sectional view taken generally along the line 17—17 of FIG. 14, following assembly of the grip to the handle shaft, and illustrating an alternative means for securing the grip to the handle shaft, wherein a mechanical lock is employed having barbs which permit the grip to be slid onto the handle shaft, but prevent removal of the grip therefrom.
Figure 16:
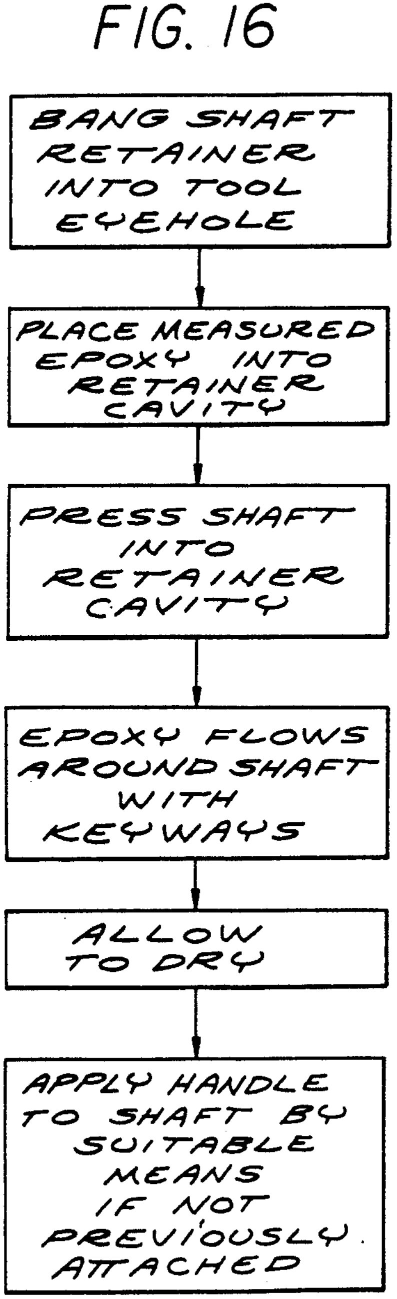
FIG. 16 is an assembly diagram showing the assembly steps of the tool handle to the percussive tool head.

An alternative means for securely attaching the grip 30 to the handle shaft 28 is illustrated in FIG. 17. In this embodiment, the securing means comprises a mechanical lock which is illustrated as a rack of unidirectional spring-steel barbs 64 fixed to at least one surface of the handle shaft 28 below the bottom edge 36 of the tool head 26. The barbs 64 are constructed so as to allow the grip 30 to be slid onto the handle shaft 28, but prevent removal of the grip from the handle shaft. The design of the barbs 62 permits the surfaces of the cavity 62 of the grip 30 to slide over the sharp edges thereof, but these same sharp edges dig into the relatively soft material of the grip 30 if the grip is pulled in an opposite direction.

As mentioned previously, the handle shaft 28 is provided with a generally uniform cross-sectional dimension taken perpendicular its longitudinal axis. This cross-sectional dimension generally corresponds with the cross-sectional dimension of both the inner cavity 42 of the shaft retainer 22, and the cross-sectional dimension of the cavity 62 of the grip 30, when each is taken perpendicular to its longitudinal axis. This helps to insure that the handle shaft 28 will not be permitted to twist or turn relative to the shaft retainer 22, and further that the grip 30 will not be permitted to twist and/or turn relative to the handle shaft 28.

The assembly of the tool handle 20 is illustrated best in FIGS. 2, 10-12, 14 and 16. Whether the tool handle 20 is being utilized by an original equipment manufacturer in a factory, or by a field user in re-handling a tool, the present invention provides a highly reliable, simplified method by which a handle can be installed onto most types of percussive tool heads, in a manner which effectively prohibits the tool head from flying off the handle unintentionally. First, as illustrated in FIG. 10, the shaft retainer 22 is banged or thumped into the eyehole 24 from the top 34 of the tool head 26. Since the upper portion 40 of the shaft retainer 22 is incapable of passing through the eyehole 24, there is no danger that the tool head 26 will ever fly off the tool handle 20. Further, since the outer surface 38 of the shaft retainer 22 is configured to generally match the taper of the eyehole 24, there is typically a solid area of contact between the shaft retainer 22 and the body 32 of the tool head 26 within the eyehole 24. It has been found that the tool handle 20 performs satisfactorily so long as a minimum of twenty-five percent of the body 32 surrounding the eyehole 24 is in direct contact with the outer surface body portion 38 of the shaft retainer 22.

Next, a measured quantity of the adhesive 52 is placed within the inner cavity 42 of the shaft retainer 22. This is but a preparatory step which is done prior to driving the upper end 48 of the handle shaft 28 into the inner cavity 42.

As the upper end 48 of the handle shaft 28 is driven into the inner cavity 42, the adhesive 52 flows into the keyways 46 and 50, and spreads generally uniformly between the handle shaft 28 and the shaft retainer 22. The ribs 54 tend to align the handle shaft 28 with respect to the shaft retainer, and further to provide enough frictional force between the handle shaft 28 and the shaft retainer 22, that the lower end 56 of the handle shaft 28 can be grasped and lifted, before the adhesive 52 has been allowed to bond the handle shaft 28 to the shaft retainer 22, without any separation of those two components. This is often desirable in a manufacturing operation.

In many instances the grip 30 will have been previously molded directly onto the handle shaft 28 (FIG. 1).

In this case, after the adhesive 52 has been allowed to cure, assembly of the tool handle 20 to the tool head 26 is complete. However, it is sometimes preferable to ensheathe a lower portion of the handle shaft 28 with a grip 30 of a selected length after the upper end 48 of the handle shaft 28 is bonded within the inner cavity 42 of the shaft retainer 22. Two methods are illustrated in the accompanying drawings for attaching the grip 30 to the handle shaft 28. In a first of these embodiments, an adhesive 60 is placed within the cavity 62 of the grip 30 in much the same manner as the adhesive 52 is placed within the inner cavity 42 of the shaft retainer 22. As the grip 30 is slid over the handle shaft 28, the adhesive 60 becomes generally uniformly dispersed between the walls of the cavity 62 and the handle shaft 28. Once this adhesive 60 has been allowed to cure, the handling of the tool is complete, and the completed tool handle 20 may be used for all intended purposes.

In a second preferred method of attaching the grip 30 to the handle shaft 28, a rack of barbs 64 is attached by any suitable means to the handle shaft 28, and then the grip is simply slid over the barbs 64 to abut against the tool head 26. The barbs 64 prevent removal of the grip 30 in much the same manner as the adhesive 60 does.

From the foregoing it is to be appreciated that the present invention provides a highly reliable, simplified method by which a handle can be installed onto a percussive tool head, which effectively prohibits the tool head from flying off the handle unintentionally. The tool handle 20 of the present invention includes a minimum number of separate parts which greatly simplifies assembly of the handle to the tool head 26. Moreover, the grip 30 may be molded so that it will comfortably fit a user's hands. The tool handle 20 of the present invention facilitates use of reinforced composite tool handles as field replacements for older tools, and the present method overcomes drawbacks associated with fixing such handles within the eyehole of the tool head solely by means of an epoxy.

Although a particular embodiment of the invention has been described in detail for purposes of illustration, various modifications may be made without departing from the spirit and scope of the invention. Accordingly, the invention is not to be limited, except as by the appended claims.

I claim:

1. A hand tool, comprising:

a tool head having a body and an eyehole through the body, wherein the eyehole includes a taper extending toward a top of the tool head;

a shaft retainer dimensioned for partial insertion into the tool head through the eyehole from the top end thereof, wherein the shaft retainer forms a tapered, generally frusto-conical slug having an outer surface portion generally corresponding to a portion of the eyehole adjacent to the top of the tool head, an upper enlarged portion incapable of passing through the eyehole, and an inner cavity having an opening opposite to the upper enlarged portion; and a high strength handle shaft having an upper end fixed within the inner cavity of the shaft retainer;

wherein the shaft retainer includes means within the inner cavity for rigidly aligning the longitudinal axis of the handle shaft with the longitudinal axis of the shaft retainer, wherein the aligning means includes a plurality of coinable longitudinal ribs which protrude into the inner cavity for frictionally engaging the handle shaft without embedding therein as the handle shaft is insérted into the inner cavity, whereby the frictional engagement between the ribs and the handle shaft permits the handle shaft to be lifted without a separation of the shaft retainer from the handle shaft.

2. A hand tool as set forth in claim 1, wherein the handle shaft extends substantially the length of the eyehole and downwardly from a lower aperture thereof.

3. A hand tool as set forth in claim 2, including a grip which ensheathes the handle shaft, wherein an upper end of the grip is situated adjacent to a portion of the tool head.

4. A hand tool as set forth in claim 3, including means for securely attaching the grip to the handle shaft, wherein the means for securely attaching the grip to the handle shaft comprises an adhesive compound interposed between the grip and the handle shaft.

5. A hand tool as set forth in claim 3, including means for securely attaching the grip to the handle shaft, comprising barb means which permit the grip to be slid onto the handle shaft, but prevent removal of the grip from the handle shaft.

6. A hand tool as set forth in claim 1, wherein the handle shaft is provided with a generally uniform cross-sectional dimension taken perpendicular to its longitudinal axis, and wherein said cross-sectional dimension generally corresponds with the cross-sectional dimension of the inner cavity taken perpendicular to the longitudinal axis of the shaft retainer.

7. A hand tool as set forth in claim 1, wherein the surfaces of the inner cavity of the shaft retainer include keyways which extend generally perpendicularly to the longitudinal axis of the shaft retainer, and wherein at least one of the surfaces of the upper end of the handle shaft includes keyways which extend generally perpendicularly to the longitudinal axis of the handle shaft.

8. A tool handle for a tool having a tool head including a tapered eyehole, the tool handle comprising:

a tapered shaft retainer dimensioned for insertion into the eyehole of the tool head from a top end thereof, the shaft retainer forming a generally frusto-conical slug having an outer surface portion generally corresponding to a portion of the eyehole, an upper enlarged portion incapable of passing through the eyehole, and an inner cavity having an opening opposite to the upper enlarged portion, wherein the inner cavity is slightly tapered to expand toward an upper end opposite to the opening thereof;

a high strength handle shaft having an upper end inserted into the inner cavity of the shaft retainer such that the shaft extends substantially the length of the eyehole and downwardly from a lower aperture thereof;

means for bonding the upper end of the shaft within the inner cavity of the shaft retainer; and a grip attached to the handle shaft;

wherein the shaft retainer includes means within the inner cavity for rigidly aligning the longitudinal axis of the handle shaft with the longitudinal axis of the shaft retainer.

9. A tool handle as set forth in claim 8, wherein the aligning means includes a plurality of longitudinal ribs which protrude into the inner cavity for frictionally engaging the handle shaft as it is inserted into the inner cavity, whereby the frictional engagement between the ribs and the handle shaft permits the handle shaft to be lifted without a separation of the shaft retainer from the handle shaft.

10. A tool handle as set forth in claim 8, wherein the surfaces of the inner cavity of the shaft retainer include keyways which extend generally perpendicularly to the longitudinal axis of the shaft retainer.

11. A tool handle as set forth in claim 8, wherein at least one of the surfaces of the upper end of the handle shaft includes keyways which extend generally perpendicularly to the longitudinal axis of the handle shaft.

12. A tool handle as set forth in claim 8, wherein the handle shaft is provided with a generally uniform cross-sectional dimension taken perpendicular to its longitudinal axis, and wherein said cross-sectional dimension generally corresponds with the cross-sectional dimension of the inner cavity taken perpendicular to the longitudinal axis of the shaft retainer.

13. A tool handle as set forth in claim 8, wherein the bonding means comprises an adhesive compound interposed between the upper end of the shaft and the inner cavity of the shaft retainer.

14. A tool handle as set forth in claim 8, wherein an upper end of the grip is situated adjacent to a portion of the tool head.

15. A tool handle as set forth in claim 8, wherein the grip is molded directly onto the handle shaft.

16. A tool handle as set forth in claim 8, wherein the grip is slidably received onto the handle shaft from a lower end thereof, and secured thereon by means of an adhesive.

17. A tool handle as set forth in claim 8, wherein the grip is slidably received onto the handle shaft from a lower end thereof, and secured thereon by means of a mechanical attachment.

18. A tool handle as set forth in claim 17, wherein the mechanical attachment includes barb means which permit the grip to be slid onto the handle shaft, but prevent removal of the grip from the handle shaft.

19. A tool, comprising:

a tool head having a body and an eyehole through the body, wherein the eyehole includes a taper expanding towards a top of the tool head;

a shaft retainer dimensioned for partial insertion into the tool head through the eyehole from the top end thereof, wherein the shaft retainer forms a tapered, generally frusto-conical slug having an outer surface portion generally corresponding to a portion of the eyehole adjacent to the top of the tool head, an upper enlarged portion incapable of passing through the eyehole, and an inner cavity having an opening opposite to the upper enlarged portion, wherein the surfaces of the inner cavity are slightly tapered to expand toward an upper end opposite to the opening thereof, and include keyways which extend generally perpendicularly to the longitudinal axis of the shaft retainer;

a high strength handle shaft having an upper end inserted into the inner cavity of the shaft retainer such that the shaft extends substantially the length of the eyehole and downwardly from a lower aperture thereof, wherein at least one of the surfaces of the upper end of the handle shaft includes keyways which extend generally perpendicularly to the longitudinal axis of the handle shaft;

means within the inner cavity for rigidly aligning the longitudinal axis of the handle shaft with the longitudinal axis of the shaft retainer, the aligning means including a plurality of longitudinal ribs which protrude into the inner cavity for frictionally engaging the handle shaft as it is inserted into the inner cavity;

means for bonding the upper end of the shaft within the inner cavity of the shaft retainer, the bonding means including an adhesive compound interposed between the upper end of the shaft and the inner cavity of the shaft retainer; and a grip which ensheathes the handle shaft, wherein an upper end of the grip is situated adjacent to a portion of the tool head;

wherein the handle shaft is provided with a generally uniform cross-sectional dimension taken perpendicular to its longitudinal axis, and wherein said cross-sectional dimension generally corresponds with the cross-sectional dimension of the inner cavity taken perpendicular to the longitudinal axis of the shaft retainer.

20. A tool as set forth in claim 19, wherein the grip is molded directly onto the handle shaft.

21. A tool as set forth in claim 19, including means for securely attaching the grip to the handle shaft, said means comprising an adhesive compound interposed between the grip and the handle shaft.

22. A tool as set forth in claim 19, including means for securely attaching the grip to the handle shaft, said means comprising a mechanical lock having barb means which permit the grip to be slid onto the handle shaft, but prevent removal of the grip from the handle shaft.

23. A method of constructing a hand tool, the steps comprising:

providing a tool head having a body and an eyehole through the body, wherein the eyehole includes a taper expanding toward a top of the tool head;

providing a tapered shaft retainer dimensioned for partial insertion into the tool head through the eyehole from the top end thereof, the shaft retainer having an outer surface portion generally corresponding in shape and dimension to the eyehole taper of the tool head, an upper enlarged portion incapable of passing through the eyehole, and an inner cavity having an opening opposite to the upper enlarged portion, the surfaces of the inner cavity having keyways extending generally perpendicularly to the longitudinal axis of the shaft retainer;

inserting the shaft retainer into the eyehole of the tool head through the upper end thereof, such that the outer surface portion of the shaft retainer frictionally engages the eyehole taper, and such that the upper enlarged portion of the shaft retainer projects upwardly above the tool head;

placing a measured adhesive into the inner cavity of the tapered shaft retainer; and pressing a high strength handle shaft into the inner cavity of the tapered shaft retainer such that the measured adhesive is caused to flow into the keyways.

24. A method as set forth in claim 23, including the step of aligning the longitudinal axis of the handle shaft with the longitudinal axis of the shaft retainer.

25. A method as set forth in claim 23, including the step of providing keyways in at least one of the surfaces of the upper end of the handle shaft, which shaft keyways extend generally perpendicularly to the longitudinal axis of the handle shaft, wherein during the step of pressing the high strength handle shaft into the inner cavity of the tapered shaft retainer, the measured adhesive is caused to flow into the shaft keyways.

26. A method as set forth in claim 25, including the step of allowing the measured adhesive to cure and bond the upper end of the handle shaft within the inner cavity of the shaft retainer.

27. A method as set forth in claim 23, including the step of molding a grip directly onto the handle shaft.

28. A method as set forth in claim 23, including the steps of sliding a grip onto the handle shaft from a lower end thereof, and attaching the grip to the handle shaft.

29. A method as set forth in claim 28, wherein the step of sliding a grip onto the handle shaft from a lower end thereof, includes the placing of one end of the grip adjacent to a portion of the tool head.

30. A method as set forth in claim 28, wherein the step of attaching the grip to the handle shaft includes the step of placing a measured adhesive into a cavity provided within the grip such that as the grip is slid onto the handle, the adhesive is evenly spread between the grip and the handle shaft for forming a bond therebetween.

31. A method as set forth in claim 28, wherein the step of attaching the grip to the handle shaft includes the provision of a mechanical lock comprising barb means attached to the handle shaft, which permit the grip to be slid onto the handle shaft, but prevent removal of the grip from the handle shaft.

32. A method as set forth in claim 23, wherein the shaft retainer includes a plurality of coinable longitudinally extending ribs protruding into the inner cavity, wherein during the step of pressing the high strength handle shaft into the inner cavity, the ribs frictionally engage the handle shaft without embedding into the handle shaft, whereby the frictional engagement between the ribs and the handle shaft permits the handle shaft to be lifted, prior to a curing of the measured adhesive, without a separation of the tool head from the handle shaft.

33. A method of attaching a handle to a tool head having an eyehole therethrough, the steps comprising:

inserting a slug into the eyehole from a top end thereof, wherein the slug includes an upper portion incapable of passing through the eyehole, an inner cavity having an opening opposite to the upper portion, an outer surface portion in engagement with the tool head, and a plurality of coinable longitudinally extending ribs protruding into the inner cavity;

placing a measured adhesive into the inner cavity of the slug; and pressing a handle shaft into the inner cavity of the slug such that the ribs frictionally engage the handle shaft without embedding into the handle shaft, whereby the frictional engagement between the ribs and the handle shaft permits the handle to be lifted, prior to a curing of the measured adhesive, without a separation of the tool head from the handle.

34. A method as set forth in claim 33, including the step of molding a grip directly onto the handle shaft.

35. A method as set forth in claim 33, including the steps of sliding a grip onto the handle shaft from a lower end thereof, placing a measured adhesive into a cavity provided within the grip such that as the grip is slid onto the handle shaft, the adhesive is evenly spread between the grip and the handle shaft for forming a bond therebetween, and placing one end of the grip adjacent to the tool head.

36. A method as set forth in claim 33, including the step of attaching a grip to the handle shaft, the attaching step including the provision of a mechanical lock comprising barb means attached to the handle shaft, which permits the grip to be slid onto the handle shaft, but prevents removal of the grip from the handle shaft.

37. A method as set forth in claim 33, including the step of aligning the longitudinal axis of the handle shaft with the longitudinal axis of the slug as the handle shaft is pressed into the inner cavity of the slug.

38. A tool handle for a tool having a tool head including a tapered eyehole, the tool handle comprising:

a tapered shaft retainer dimensioned for insertion into the eyehole of the tool head from a top end thereof, the shaft retainer forming a generally frusto-conical slug having an outer surface portion generally corresponding to a portion of the eyehole, an upper enlarged portion incapable of passing through the eyehole, and an inner cavity having an opening opposite to the upper enlarged portion, wherein the inner cavity is slightly tapered to expand toward an upper end opposite to the opening thereof, and the surfaces of the inner cavity including keyways which extend generally perpendicularly to a longitudinal axis of the shaft retainer;

a high strength handle shaft having an upper end inserted into the inner cavity of the shaft retainer such that the shaft extends substantially the length of the eyehole and downwardly from a lower aperture thereof;

means for bonding the upper end of the shaft within the inner cavity of the shaft retainer; and a grip attached to the handle shaft.

39. A tool handle as set forth in claim 38, wherein at least one of the surfaces of the upper end of the handle shaft includes keyways which extend generally perpendicularly to the longitudinal axis of the handle shaft.

40. A tool handle as set forth in claim 38, wherein the handle shaft is provided with a generally uniform cross-sectional dimension taken perpendicular to its longitudinal axis, and wherein said cross-sectional dimension generally corresponds with the cross-sectional dimension of the inner cavity taken perpendicular to the longitudinal axis of the shaft retainer.

41. A tool handle as set forth in claim 38, wherein the bonding means comprises an adhesive compound interposed between the upper end of the shaft and the inner cavity of the shaft retainer.

42. A tool handle as set forth in claim 38, wherein an upper end of the grip is situated adjacent to a portion of the tool head, and the grip is molded directly onto the handle shaft.

* * * * *